(12) United States Patent
Coupe et al.

(10) Patent No.: US 8,687,014 B2
(45) Date of Patent: Apr. 1, 2014

(54) PROCESS AND APPARATUS FOR BLENDING IMAGES

(75) Inventors: David Coupe, Valbonne (FR); Gilles Spinelli, Le Tignet (FR)

(73) Assignee: ST-Ericsson SA, Plan-les-Ouates (CH)

( * ) Notice: Subject to any disclaimer, the term of this patent is extended or adjusted under 35 U.S.C. 154(b) by 193 days.

(21) Appl. No.: 13/142,563

(22) PCT Filed: Dec. 29, 2009

(86) PCT No.: PCT/EP2009/009313
§ 371 (c)(1),
(2), (4) Date: Aug. 29, 2011

(87) PCT Pub. No.: WO2010/078954
PCT Pub. Date: Jul. 15, 2010

(65) Prior Publication Data
US 2011/0304642 A1      Dec. 15, 2011

(30) Foreign Application Priority Data

Dec. 31, 2008   (EP) .................................... 08368026

(51) Int. Cl.
*G09G 5/02* (2006.01)
*G09G 5/00* (2006.01)

(52) U.S. Cl.
USPC ........... 345/592; 345/593; 345/594; 345/600; 345/601; 345/602; 345/603; 345/604; 345/605; 345/606

(58) Field of Classification Search
USPC ........................................... 345/592, 593, 59
See application file for complete search history.

(56) References Cited

U.S. PATENT DOCUMENTS 6,023,302 A * 2/2000 MacInnis et al. ............. 348/597
(Continued)

FOREIGN PATENT DOCUMENTS

EP          0533348 A      3/1993
(Continued)

OTHER PUBLICATIONS

Smith, A.R., "ALpha and the History of Digital Compositing", Microsoft Technical Memo., No. 7, Aug. 15, 1995, XP002489918.

(Continued)

*Primary Examiner* — David T Welch
*Assistant Examiner* — F. M. Hossain
(74) *Attorney, Agent, or Firm* — Coats & Bennett, P.L.L.C.

(57) ABSTRACT

A process and circuit for blending a foreground image (B) with a background image (A), said foreground and background images being arranged in pixels and having color representations (R, G, B). The foreground foreground image (A) has a transparency parameter (T(x,y)) in accordance with a so-called alpha plane representative of the transparency profile to apply to the foreground image. The process involves the steps of: -applying a dithering method on said alpha plane in order to convert said transparency parameter (T) into a one-bit transparency parameter (T'); -use said one-bit transparency parameter (T') for controlling a multiplexing unit having two inputs respectively receiving the foreground image (A) and the background image (B). In one embodiment, the one-bit transparency parameter T' into the two extreme values of a range of continuous values, for instance coded on 8 bits. The process then applies a four-pixel interpolation method to the foreground image (A) for the purpose of creating a five level transparency parameter in the blending process, and then uses the five level transparency parameter for controlling a multiplexing circuit for the purpose of achieving blending of the foreground image with the background image.

9 Claims, 5 Drawing Sheets

(56) References Cited

U.S. PATENT DOCUMENTS

| | | |
|---|---|---|
| 6,466,224 B1 | 10/2002 | Nagata et al. |
| 2003/0184556 A1 | 10/2003 | Hollis |
| 2008/0143737 A1* | 6/2008 | Weybrew et al. ............. 345/592 |
| 2008/0284780 A1 | 11/2008 | Hsu |

FOREIGN PATENT DOCUMENTS

| | | | |
|---|---|---|---|
| GB | 2223917 A | 4/1990 |  |
| WO | 96/20470 A | 7/1996 |  |
| WO | 97/33437 A | 9/1997 |  |

OTHER PUBLICATIONS

Porter, T. et al., "Compositing Digital Images", Computer Graphics, ACM, US vol. 18, No. 3, Jul. 1, 1984 pp. 253-259, XP000609391, ISSN: 0097-8930.

* cited by examiner $$\alpha + \beta + \gamma + \delta = 1.0$$

$$P = \frac{A+B+C+D}{4}$$

PROCESS AND APPARATUS FOR BLENDING IMAGES

TECHNICAL FIELD

The present invention relates to digital image processing and more particularly to a process for blending images.

STATE OF THE ART

With the advent of digital wireless communications and the development of mobile telephone, graphic and video processing is taking a great importance for mobile phone consumers.

More and more mobile phones get new capabilities where deeper colour schemes are used as well as video objects can be displayed. Beside the construction of objects to display, there is a real challenge in combining and displaying them in the most efficient way.

The functions to achieve consist in assembling several sources of graphic or video with the following transformations:
Colour conversion
Geometric transformation. Ex affine transform: Translation, Rotation, Scaling, Shearing, Mirroring, and Symmetry.
Selection and Mixing. The various sources called "plane" will be layered from background to foreground with simple overlay or more complex transparency effect.
When a true blending function is applied, the foreground plane information is weighted by a decimal factor whose value is in [0,1] range while the background plane is weight by one minus this factor. The transparency information can come from several sources:
Global transparency information per layer.
Transparency information from colour value (also called chroma keying)
Transparency information from pixel value All above functions are generally implemented in the display composition unit or the graphic renderer. Albeit, the transparency management is generally the last item integrated in HW since the transparency management at pixel level is quite consuming in HW resources and memory footprint.

Indeed up to colour keying complexity of the underlying hardware is quite simple since relying on a simple selection whose criterion source is either a constant value for the whole "plane" or a specific colour value declared as the transparent one. Supporting a "per pixel" blending composition capability require a true multiplication and accumulation function as well as a dedicated transparency information per pixel stored in system memory.

These sophisticated blending schemes implicitly discard older generation HW when it is time to evolve the man machine interface outlook.

With respect to FIG. 1A, there is recalled the very classic chroma-Keying selection process for blending one foreground image A with a background image B. The mechanism is based, for each pixel to be displayed, on a multiplexor 10 which receives at a first input the color (R, B, G component) of an image A which has to be displayed on the foreground, while a second input receives the color component of an image B considered as the background. Multiplexor 10 is controlled by a comparator 11 which compares the component value of the foreground image with a reference value (CHROMA Keying) which, upon equality, causes multiplexor 10 to output the background component B.

The great advantage of this first prior art mechanism results from the very simple and low cost structure which is advantageous in a small device such as a mobile telephone. However, the drawback results in the fact that there is no blending of the images, nor control on the transparency provided the limited graphical hardware.

FIG. 1B illustrates another prior art technique which provides better control on the blending process of the two foreground and background images. The mechanism is based on one adder 20 which two inputs respectively receive the output of one multiplier (resp. 21 and 22). Multiplier 21 computes the value $A \times (1-\alpha)$ while multiplier 22 yields $\alpha \times B$. There is therefore generated the value $A \times (1-\alpha) + \alpha \times B$ which provides improved and "continuous" control on the blending effect and, therefore, more efficient graphic display.

The drawback of this second prior art technique lies in the fact that, firstly, a complex hardware circuitry is necessary for embodying the two multipliers.

In addition, more storage space would be required for embodying a 8 bits blending process where the $\alpha$ value can be different for each pixel.

For the sake of illustration, one may consider the following example simple colour scheme based on indirect colour information access are quite efficient to store a bitmap. A QVGA image using a colour lookup table mechanism of 256 colour entries will required 320×240 bytes to store the picture content plus the colour lookup table (CLUT) itself. Supposing the CLUT entry is made of 3 bytes (Red, Green and Blue channel coded on 8 bits), the whole image will take: 320×240+256×3=77568 bytes. Multiple levels of transparencies are effectively required; it is typically 16, 64 or even 256 levels. Beyond 16 levels and because of byte alignment constraint, a full transparency byte will be required for each pixel. In case of the former QVGA example, it will simply double the storage requirement. Considering now a "true colour" description where each pixel gets its colour information directly coded as 16 bits, 18 bits or 24 bits for a 65K, 262K and 16M colours scheme respectively; the storage is increased by 2 or 3. Adding the "per pixel blending" is further increasing by a factor of 4 the storage requirement.

It is desirable to get a graphical rendering as close as possible to the one obtained with the process of FIG. 1B, but with a combination of hardware circuitry which is as close as possible to the selection circuit of FIG. 1A.

The benefit would be clear: higher reuse of available graphical circuits and, furthermore, the reduction in the memory footprint allocated to image storage area.

SUMMARY OF THE INVENTION

It is an object of the present invention to provide a process for performing blending of two images with a limited hardware circuitry and high rendering graphical blending.

It is a further object of the present invention to provide with a circuit for controlling transparency of a foreground image with respect to a background image which requires limited hardware and is cheap to manufacture.

It is still a further object of the present invention to carry out a process and device for controlling blending of two images which are suitable for mobile telephone equipments.

These and other objects are achieved by means of a process for blending a foreground image (B) with a background image (A) in accordance with a transparency parameter being is coded over N bits.
The foreground and background images being arranged in pixels and have color representations (e.g. R, G, B). The transparency parameter (T(x,y)) defines a so-called alpha plane representative of the transparency profile to apply to the foreground image.

The process involves the steps of:
applying a dithering method on said alpha plane in order to convert said transparency parameter (T) into a one-bit transparency parameter (T');
using said one-bit transparency parameter (T') for controlling a multiplexing unit having two inputs respectively receiving the foreground image (A) and the background image (B).

In one embodiment, the one-bit transparency parameter T' is converted into the two extreme values of a range of continuous values, for instance coded on 8 bits.

In one embodiment, the process applies a four-pixel interpolation method to the foreground image (A) for the purpose of creating a five level transparency parameter and then uses the results five levels transparency parameter for controlling a selection circuit based on a simple multiplexor.

There is thus achieved a sophisticated (5-level) blending process with very simple hardware circuitry, based on multiplexing circuit.

In one embodiment, the one-bit transparency parameter T' is converted into either 00 or FF in a 8-bit representation format.

Preferably, the dithering method is a Floyd Steinberg dithering method.

Alternatively, the dithering method may be a Halftoning or dithered order. Actually any available dithering algorithm can fit.

The invention also provides a graphical circuit for blending a foreground image (B) with a background image (A) in accordance with a transparency parameter (T(x,y)) coded on N-bits and defining an alpha plane representative of the transparency to apply to the foreground image. The circuit includes multiplexing means for multiplexing either the color components from background image (B) or foreground image (A) and is characterized by
means for applying a dithering method on said alpha plane in order to convert said transparency parameter (T) into a one-bit transparency parameter (T');
means for applying said one-bit transparency parameter (T') to said multiplexing means.

In one embodiment, the circuit further includes:
means for converting said one-bit transparency parameter T' into the two extreme values of a range of continuous values, for instance coded on 8 bits;
means for performing a four-pixel interpolation method to the foreground image (A) for the purpose of creating a five level transparency parameter in the blending process;
means for applying said five level transparency parameter for controlling said multiplexing means so as to achieve improved blending of the foreground image is with the background image.

The circuit of the invention is particularly suitable for carrying out graphical circuits of handheld or mobile telephone displays, but can encompass other domains where similar needs are required.

DESCRIPTION OF THE DRAWINGS

Other features of one or more embodiments of the invention will best be understood by reference to the following detailed description when read in conjunction with the accompanying drawings.

FIG. 3A illustrates the original ALPHA plane profile coded on 8 bits, while

DESCRIPTION OF THE PREFERRED EMBODIMENTS

The embodiment which is disclosed below is particularly suitable for the design of a graphical display circuit for small devices such as handheld, mobile telephones etc. . . . which have limited resources.

However, it should be clear that this is only one particular embodiment of the process and circuit of the invention and that the latter is likely to be adapted to a wide range of applications.

It is assumed that foreground image A is defined for each pixel (X,Y) by the three basic components $R_A(x,y)$, $G_A(x,y)$ and $B_A(x,y)$ band also by a transparency factor $T(x,y)$ which is used for controlling the blending process. It should be noticed that the system of representation R-G-B is only given as an example and that another system of presentation may be considered.

In the preferred embodiment, each pixel has a representation which is coded with 32 bits, defining the parameters:

$$(T(x,y), R_A(x,y), G_A(x,y), B_A(x,y))$$

Figure 3A:
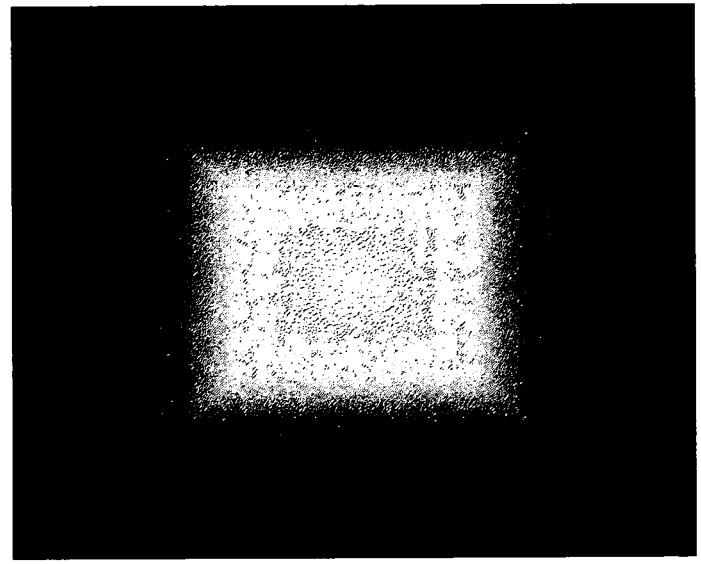

The $T(x,y)$ parameter defines the profile of transparency which will be used in the blending process, which can be coded with N=8 bits, and may be represented by a so-called ALPHA PLANE represented in FIG. 3A.

or $(T, R_A, G_A, B_A)$ in short.

Similarly, the background image B is assumed to be represented, for each pixel (x,y) by the components: $(R_B, G_B, B_B)$ With respect to FIG. 2A, there is now described one embodiment of the process for blending a foreground image A with a background image B.

the process starts with a step 21 which consists in the application of a dithering method on the alpha plane representative of the transparency profile of the foreground image to blend, for the purpose of reducing the $T(x,y)$ transparency parameter to a 1 bit parameter.

Many dithering techniques may be considered for achieving this 8 bits to 1 bit conversion process, such as, for instance and without any limitation, a halftoning, a dithered ordered or, in the preferred embodiment, a Floyd-Steinberg dithering technique.

Figure 4:
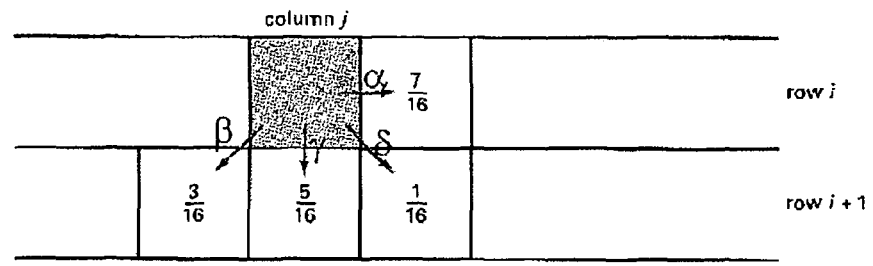
FIG. 4 illustrates the principle of the Floyd-Steinberg dithering method.

Dithering techniques are well known in the art and, for the sake of conciseness, they will not be further elaborated on. Regarding the preferred embodiment, the Floyd-Steinberg technique, it suffices to recall that the Floyd-Steinberg algorithm can be applied to any quantization process and particularly to a reduction to a single bit. FIG. 4 recalls the general process which is based on the distribution of the dithering error, weighted by a set of values $\alpha=7/16$, $\beta=3/16$; $\gamma=5/16$ and $\delta=1/16$ on the four close neighbouring pixels, respectively at the left edge, the bottom, the right edge of row j+1, and the pixel at the right of row j, in accordance with the following scheme:

The initial quantity is quantized according to the output number of levels allocated for data representation The error value is calculated by subtracting the quantized value to the original quantity The error is added to neighbours pixel according to the following pattern and weight:

The picture scan can be done in normal raster scan, but some algorithm alternate line scanning from left-to-right with right-to left depending on the line number parity The process uses the dithering method for the purpose of converting T transparency parameter (coded with N bits) to a one-bit transparency parameter T' in a step 22.

Then, in a step 23, the process uses the computed T' parameter as a control signal for controlling multiplexing circuits, having two inputs respectively receiving the color components of the foreground image (A) and the background image (B).

It has been observed, and this is a very interesting effect, that a aesthetical blending effect is simply achieved by means of this process.

Figure 3B:
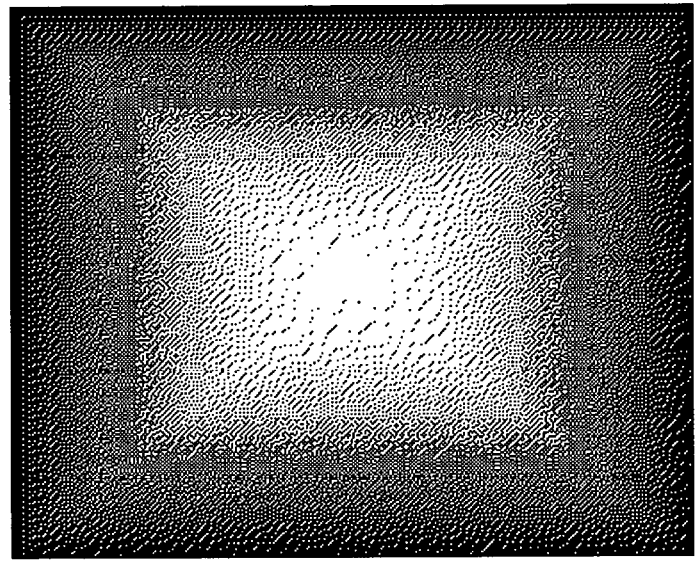
FIG. 3B illustrates the same profile after reduction by a dithering process.

The result of the application of the dithering process to the ALPHA PLANE is illustratively shown in FIG. 3B and results in the conversion of the representation of the foreground pixel transparency T into its new representation T', with the interesting result that the blending can be achieved with only one multiplexor multiplexing either ($R_A$, $G_A$, $B_A$) or ($R_B$, $G_B$, $B_B$) in accordance with the value of T'.

Figure 1A:
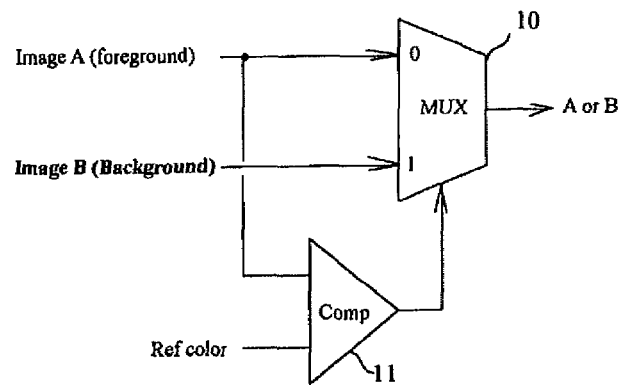
FIG. 1A illustrates the classic chroma-key selection process of the prior art.
Figure 1B:
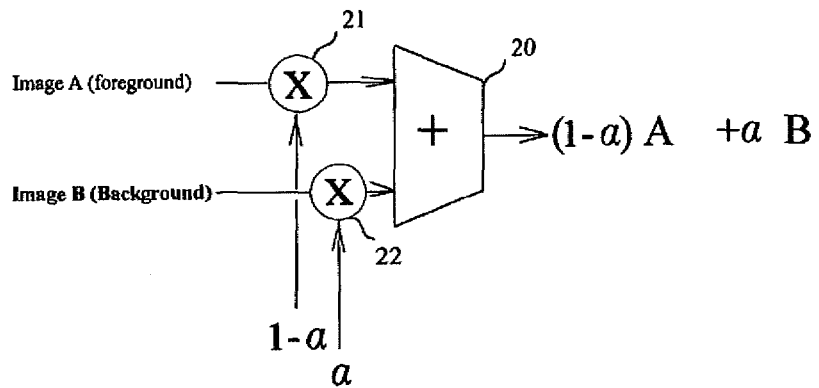
FIG. 1B illustrates the principle of a blending process providing control of the transparency of the foreground image A with respect to the background image B.

There is achieved the possibility to display a blended foreground image A with a background image B without requiring the need of any multipliers, as in the technique of FIG. 1B, which is very advantageous.

Figure 2A:
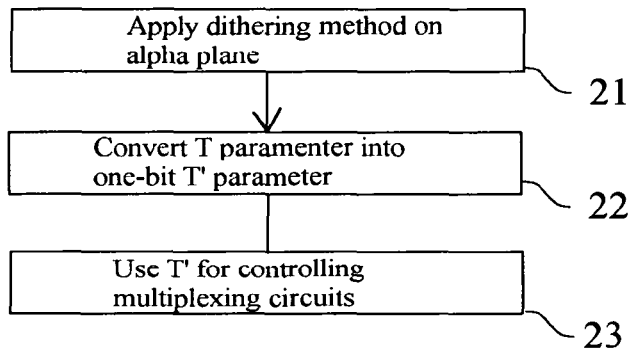
FIGS. 2A and 2B respectively show a first and a second embodiments of the blending process of the invention.
Figure 2B:
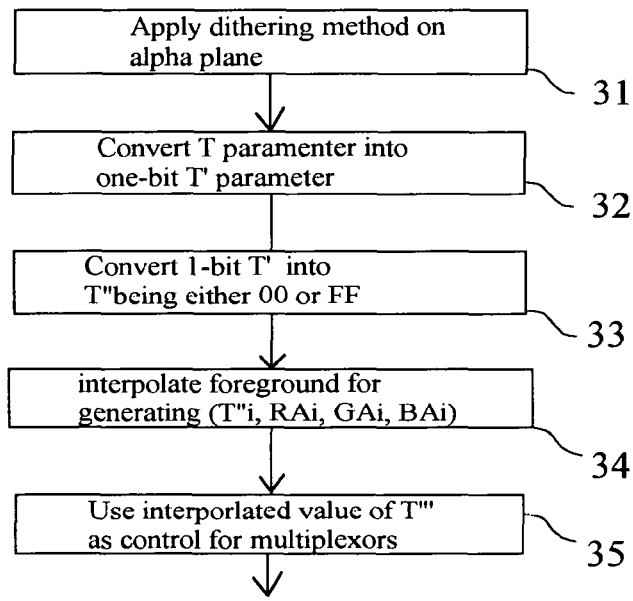

With respect to FIG. 2B, there is now described a second embodiment which significantly improves the blending effect, without additional complex circuitry.

Steps 31 and 32 of FIG. 2B are identical to steps 21 and 22 of FIG. 2A.

The second embodiment, then differs from the first embodiment in the next following steps:

The process then proceeds with a step 33 where, with the assumption of a foreground picture A made of a standard representation (24 bits per pixel) with an N=8 bit alpha plane, the one bit quantized and dithered information of the original 8 bits transparency value is converted as follows:

$$T''=0xFF \text{ if } T'=1;$$

$$T''=0x00 \text{ if the value of } T'=0.$$

value as the MSB byte

There is thus provided again a representation of the color of the picture which incorporates a transparency parameter coded onto 8 bits.

Now, in a step 34, the process proceeds with a 4-pixels interpolation of the representation (T'', $R_A$, $G_A$, $B_A$) (with T'' being the MSB) of the foreground image so as to produce an interpolated representation (T''$^i$, $R_A^i$, $G_A^i$, $B_A^i$) which takes into account of the information of four neighbouring pixels.

It should be noticed that, regarding the particular parameter T'', this 4-pixel interpolation results that five exact blending levels can be produced, corresponding to the following sequence:

0, ¼, ½, ¾ and 1.

With the significant technical effect that such blending values can easily be achieved with minimum hardware circuitry.

Indeed, in a step 35, the parameter T''' is simply used as a control signal for controlling the multiplexing circuit allowing selection between five weighted sum of the pixel of image A and pixel of image B.

Such selection requires very limited hardware circuits.

Indeed, a dividing by 2 is easily carried out by a single bit-shifting towards the LSB.

A dividing by 4 is easily produced by two consecutive bit-shifting towards the LSB.

At last, a level of ¾ is easily achieved by means of adding the two preceding levels ¼ and ½.

It can be seen, and this is a very advantageous result that without requiring complex multipliers, a five level blending process can be achieved while still using a selection multiplexor as used in the basic process of FIG. 1A.

Figure 5:
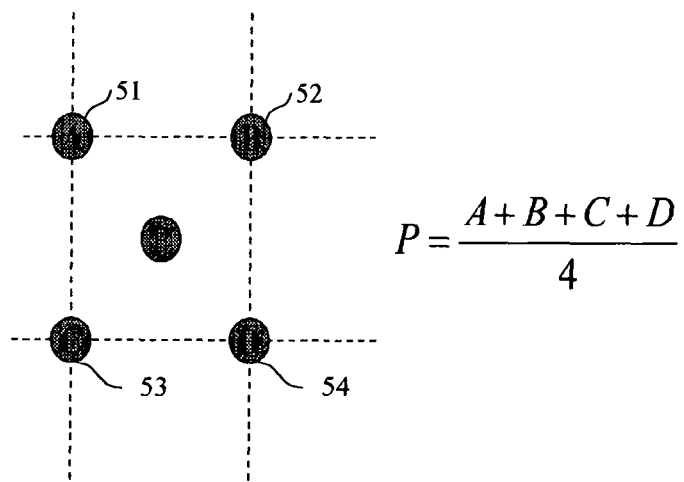
FIG. 5 illustrates the principle of the interpolation mechanism used in the embodiment for generating the interpolated pixel components.

In one particular embodiment, the interpolation process of FIG. 5 is applied for the purpose of generating the interpolated representation (T''$^i$, $R_A^i$, $G_A^i$, $B_A^i$) in accordance with the following formulas:

$$T''^i(x,y) = \tfrac{1}{4}(T''(x,y) + T''(x+1,y) + T''(x,y+1) + T''(x+1,y+1))$$

And $R_A^i$, $G_A^i$, $B_A^i$ being interpolated in a similar fashion:

$$R_A^i(x,y) = \tfrac{1}{4}(R_A(x,y) + R_A(x+1,y) + R_A(x,y+1) + R_A(x+1,y+1))$$

$$G_A^i(x,y) = \tfrac{1}{4}(G_A(x,y) + G_A(x+1,y) + G_A(x,y+1) + G_A(x+1,y+1))$$

$$B_A^i(x,y) = \tfrac{1}{4}(B_A(x,y) + B_A(x+1,y) + B_A(x,y+1) + B_A(x+1,y+1))$$

Figure 6:
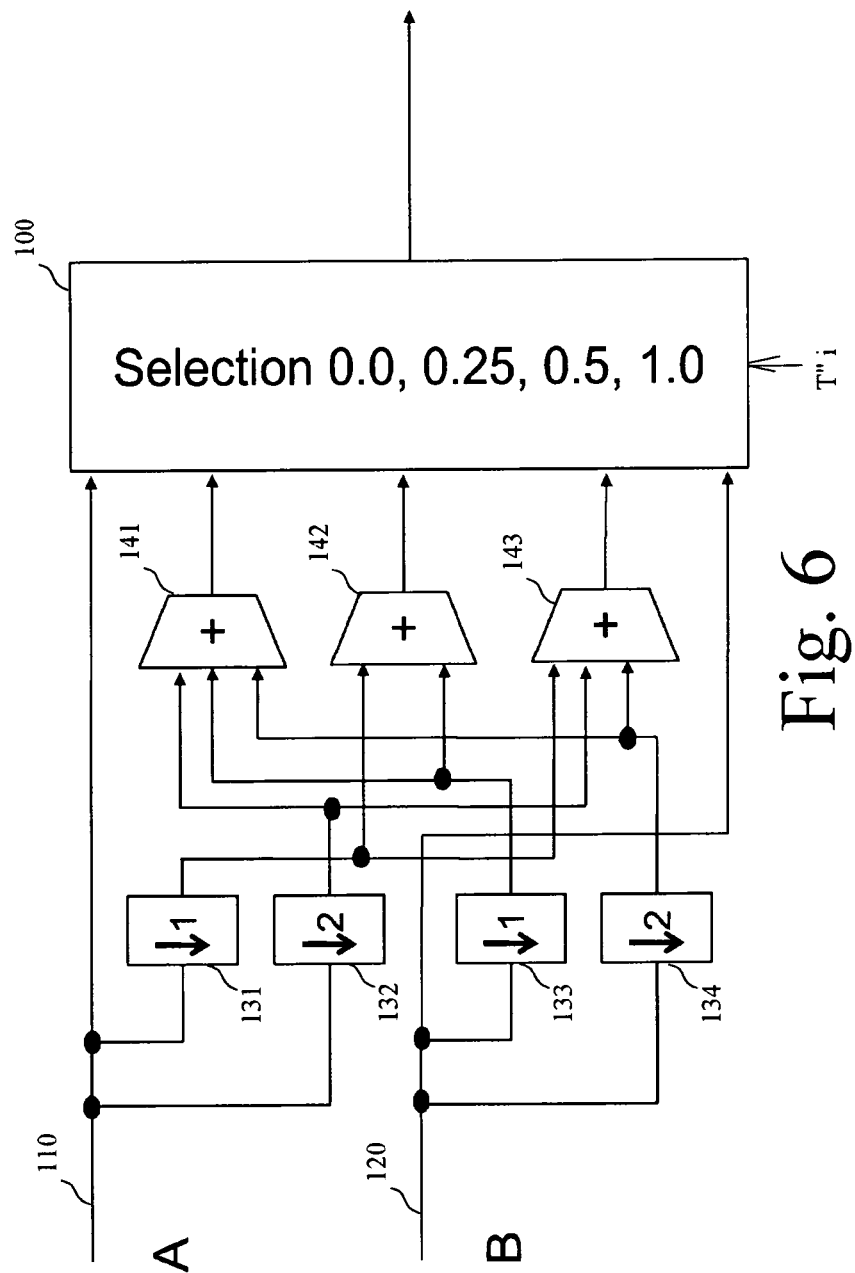
FIG. 6 illustrates the general structure of one circuit for embodying the blending process of the invention.

With respect to FIG. 6 there is now described one embodiment of a circuit which can be used for performing the blending process, and which is based on a five input multiplexing block 100, controlled by the five level T'''$^i$ parameter. The first and the fifth inputs of the latter respectively receive the component of foreground pixel A on a lead 110 and background pixel B on a lead 120.

Two one-bit shifting circuits, respectively 131 and 133 connected to lead 110 (pixel A) and 120 (pixel B), for performing a divide by two operation.

Two two-bit shifting circuits, respectively 132 and 134 connected to lead 110 (pixel A) and 120 (pixel B), for performing a divide by 4 operation.

Three adders 141, 142 and 143 have an output which are respectively connected to the second, the third and the fourth input of selection block 100.

Adder 141 has a first input connected to the output of 2-bit shifting circuit 132, a second input connected to one-bit shifting circuit 133 and a third input connected to two-bit shifting circuit 134. That adder 141 produces the value of ¼ of the component of A plus ¾ of the component of B.

Adder 142 has a first input connected to the output of one-bit shifting circuit 131 and a second input connected to one-bit shifting circuit 133 so as to produce the value of ½ the component of A and ½ that of B, that is to say a pure blending.

Adder 143 has a first input connected to the output of one-bit shifting circuit 131, a second input connected to two-bit shifting circuit 132 and a third input connected to two-bit shifting circuit 134.

The invention achieves a 8 bit-blending scheme with a single bit selection overlay associated to a fractional pixel interpolation process. In practice, it has been observed that very little penalty results from the dithering of the alpha plane and thus the one-bit reduction of the original transparency parameter T. The Floyd Steinberg dithering algorithm is traditionally considered as a quite computational intensive algorithm since often associate to large resolution object (printer hundreds of DPI resolution on a full A4 format sheet). Considering the mobile phone environment application we have considered, the screen size is either QCIF+(220×176) or QVGA (320×240). Consequently the required CPU effort needs to be very reasonable and furthermore the transparency information applies to man machine interface content, which does not vary very fast even considering small graphic animations.

The invention claimed is:

1. A method of blending a foreground image with a background image, said foreground and background images being arranged in pixels and having color representations defining the color of each pixel, the foreground image having further an N-bit transparency parameter associated with each pixel, the transparency parameters defining an alpha plane representative of a transparency to apply to the foreground image, the method comprising, for each pixel:
    applying a dithering operation on the alpha plane to convert the N-bit transparency parameter into a one-bit transparency parameter;
    multiplexing between the foreground image and the background image using the one-bit transparency parameter;
    converting the one-bit transparency parameter into one of two extreme values of a predetermined range of continuous values;
    applying a four-pixel interpolation method to the foreground image to create a five level transparency parameter; and
    multiplexing predetermined fractional mixtures of the foreground image and the background image using the five level transparency parameter.

2. The method of claim 1 wherein the predetermined range of continuous values is represented by an 8-bit value, and wherein the one-bit transparency parameter is converted into one of hexadecimal values 00 and FF.

3. The method of claim 1 wherein the dithering operation comprises a Floyd Steinberg dithering operation.

4. The method of claim 1 wherein the dithering operation comprises one of Halftoning and dithered order operations.

5. A circuit operative to blending a foreground image with a background image, the foreground and background images being arranged in pixels and having color representations defining the color of said pixel, the foreground image further having an N-bit transparency parameter associated with each pixel, the transparency parameters defining an alpha plane representative of a transparency to apply to the foreground image, the circuit comprising, for one or more pixels:
    a dithering circuit operative to apply a dithering operation on the alpha plane in order to convert the N-bit transparency parameter into a one-bit transparency parameter;
    a multiplexer operative to select the color components from the background image or the foreground image, in response to the one-bit transparency parameter value;
    a converter operative to convert the one-bit transparency parameter into one of two extreme values of a predetermined range of continuous values;
    an interpolator operative to perform a four-pixel interpolation method to the foreground image to create a five level transparency parameter; and
    a multiplexer operative to select predetermined fractional mixtures of the foreground image and the background image using the five level transparency parameter.

6. The circuit of claim 5 wherein the predetermined range of continuous values is represented by an 8-bit value, and wherein the converter is operative to convert the one-bit transparency parameter into one of the hexadecimal values 00 and FF.

7. The circuit of claim 5 wherein the dithering circuit is operative to apply a Floyd Steinberg dithering operation on the alpha plane.

8. The circuit of claim 5 wherein the dithering circuit is operative to apply one of a Halftoning and dithered order dithering operation on the alpha plane.

9. A portable communication device, comprising:
    a display operative to output a blended foreground image and background image, the foreground and background images being arranged in pixels and having color representations defining the color of said pixel, the foreground image further having an N-bit transparency parameter associated with each pixel, the transparency parameters defining an alpha plane representative of a transparency to apply to the foreground image; and
    a blending circuit performing a blending operation for output by the display, the blending circuit comprising, for one or more pixels,
        a dithering circuit operative to apply a dithering operation on the alpha plane in order to convert the N-bit transparency parameter into a one-bit transparency parameter;
        a multiplexer operative to select the color components from the background image or the foreground image, in response to the one-bit transparency parameter value;
        a converter operative to convert the one-bit transparency parameter into one of two extreme values of a predetermined range of continuous values;
        an interpolator operative to perform a four-pixel interpolation method to the foreground image to create a five level transparency parameter; and
        a multiplexer operative to select predetermined fractional mixtures of the foreground image and the background image using the five level transparency parameter.

* * * * *